US007096308B2

(12) United States Patent
Main et al.

(10) Patent No.: US 7,096,308 B2

(45) Date of Patent: Aug. 22, 2006

(54) LPC TRANSACTION BRIDGING ACROSS A PCI_EXPRESS DOCKING CONNECTION

(75) Inventors: Kevin K. Main, Plano, TX (US); Robert M. Nally, McKinney, TX (US)

(73) Assignee: Texas Instruments Incorporated, Dallas, TX (US)

( * ) Notice: Subject to any disclaimer, the term of this patent is extended or adjusted under 35 U.S.C. 154(b) by 273 days.

(21) Appl. No.: 10/651,521

(22) Filed: Aug. 29, 2003

(65) Prior Publication Data

US 2005/0060470 A1 Mar. 17, 2005

(51) Int. Cl.
*G06F 13/16* (2006.01)

(52) U.S. Cl. ....................................... 710/315; 710/306

(58) Field of Classification Search ..................... None
See application file for complete search history.

(56) References Cited

U.S. PATENT DOCUMENTS 5,590,377 A * 12/1996 Smith ......................... 710/303
6,336,158 B1 * 1/2002 Martwick ................... 710/104
6,578,101 B1 6/2003 Ahern
2003/0093607 A1 * 5/2003 Main et al. ................. 710/306
2003/0221036 A1 * 11/2003 Konetski .................... 710/303

OTHER PUBLICATIONS

Creating a PCI Express™ Interconnect—Ajay V. Bhatt, Technology and Reseach Labs, Intel Corporation—2002.*

PCI Express™ Base Specification Revision 1.0a—Section 1.1—Apr. 15, 2003—PCI-SIG.*

* cited by examiner

*Primary Examiner*—Rehana Perveen
*Assistant Examiner*—Jeremy S. Cerullo
(74) *Attorney, Agent, or Firm*—William B Kempler; W. James Brady, III; Frederick J. Telecky, Jr.

(57) ABSTRACT

A hybrid PCI_Express fabric system allows LPC bus commands and data to be sent across the PCI_Express fabric from a portable computer to its docking station. This permits the portable computer to be coupled to peripheral devices connected to the docking station without additional connectors on the portable computer and the docking station.

16 Claims, 5 Drawing Sheets

LPC TRANSACTION BRIDGING ACROSS A PCI_EXPRESS DOCKING CONNECTION

FIELD OF THE INVENTION

This application generally relates to the connection of peripheral devices to a portable computer using a docking station and more specifically to communications between a portable computer plugged into a docking station having peripheral devices connected thereto.

BACKGROUND OF THE INVENTION

Personal computer systems utilize an input/output (I/O) system that connects to peripheral devices which are needed to have an operable system. These peripheral devices are typically a keyboard, a mouse, and printer. These devices have been present from the early days of personal computers and are therefore known as legacy I/O, or XIO and now known by the term as Super I/O. The list of components that are utilized to make a Super I/O unit of a personal computers change with every generation of personal computers. New components have been added to the Super I/O such as SMbus controllers, CPU cooling fan controls and IRDA. The Super I/O unit is connected to the personal computer host by a special low bandwidth bus called the Low Pin Count (LPC) bus.

Portable computers commonly known as notebook or laptop computers, may use a docking station to connect the computer to peripheral devices, a larger monitor and a power source. When the laptop computer is docked, some of the Super I/O components functionality is transferred over to the docking station. If the LPC bus is extended to the docking station, additional connectors will have to be added to both the laptop computer and the docking station. This adds additional cost to both the laptop computer and the docking station and adds to the weight of the laptop computer. If the LPC bus is not extended, the problem is how to exchange data between the laptop computer CPU and the docking station's Super I/O components.

FIG. 1 shows a block diagram of the current configuration for extending the I/O through the docking connector into the docking station, generally as 100. In FIG. 1, the host computer 102 communicates with the Super I/O chip 106 via the LPC bus 104. Bus 104 is a bi-directional bus. The Super I/O chip breaks out the commands to each of the peripheral devices at outputs 108. Output 108*a* is for the line printer, outputs 108*b* and *c* for the communications port, output 108*d* and *e* are for the PC/2 port, output 108*f* is for the FDD (floppy disk drive) and output 108*g* is for the fast IR. These lines 108*a*–108*g* are extended through the docking connector into the port replicator of the docking station.

PCI_Express is a new architecture utilizing point-to-point transmission having a high speed which is scalable for future improvements and which will become the replacement for current PCI (Peripheral Component Interconnect) parallel bus architecture in use today. PCI_Express would provide a vehicle for communicating between the CPU of a portable computer and peripheral devices connected to a docking station, except that the command structure and connection type is incompatible with PCI_Express. The LPC bus is bi-directional half duplex bus where as PCI_Express is a unidirectional full duplex point-to-point fabric. The commands on the LPC bus are of varying length which makes it difficult to inject this data into a the data flow of another system.

Accordingly, there is a need for a low cost means of interfacing the CPU of a host computer with peripherals connected to a docking station.

SUMMARY OF THE INVENTION

It is a general object of the present invention to modify a PCI_Express switch so it can be utilized to communicate LPC transactions packets across the PCI_Express fabric.

This and other objects and features are provided, in accordance with one aspect of the invention by a computer system comprising a portable computer having a LPC bus for peripheral devices. A docking station to receive the portable computer and peripheral devices. A PCI_Express fabric coupling the portable computer and the docking station, the PCI_Express fabric communicating commands or data between the LPC bus and the peripheral devices.

Another aspect of the invention includes a computer docking station to receive a portable computer and peripheral devices having a communications link between the portable computer and the peripheral devices. A PCI_Express fabric couplable to the portable computer and at least one of the peripheral devices, the PCI_Express fabric communicating commands or data between a computer in the docking station and a peripheral device connected thereto.

A further aspect of the invention comprises a modified PCI_Express fabric. A hybrid PCI_Express downstream port couplable to a computer LPC bus and to a computer host for receiving PCI_Express packets and LPC data or commands for transmission along a PCI_Express fabric. A hybrid PCI_Express upstream port couplable to a computer peripheral device and receiving PCI_Express packets and packetized LPC data or commands from a PCI_Express fabric and separating out the LPC data or commands for use by the computer peripheral device.

A still further aspect of the invention includes a method of coupling LPC bus Transaction Packet across a boundary between a portable computer and a docking station utilizing a PCI_Express fabric. The data flow on the PCI_Express fabric is controlled to insert at a first location on the PCI_Express fabric PCI_Express packets corresponding to LPC Transaction Packet into unused portions of the PCI_Express traffic. The PCI_Express packets are received at a second location on the PCI_Express fabric and those packets corresponding to the LPC Transaction Packets are extracted. The LPC task is performed.

Yet another aspect of the invention includes a method of coupling an LPC bus across a boundary between a portable computer and a docking station, a method of sending serial IRQ or DMA requests from a peripheral device to a processor. An LPC slave coupled to the peripheral device generates a PCI_Express upstream packet requesting a serial IRQ request or DMA request. The PCI_Express upstream packet is injected into the PCI_Express fabric. The PCI_Express upstream packet is recovered in the docking station. The recovered PCI_Express upstream packet is utilized to generate sideband signals to an LPC controller.

DETAILED DESCRIPTION OF THE PRESENT INVENTION

Figure 2:
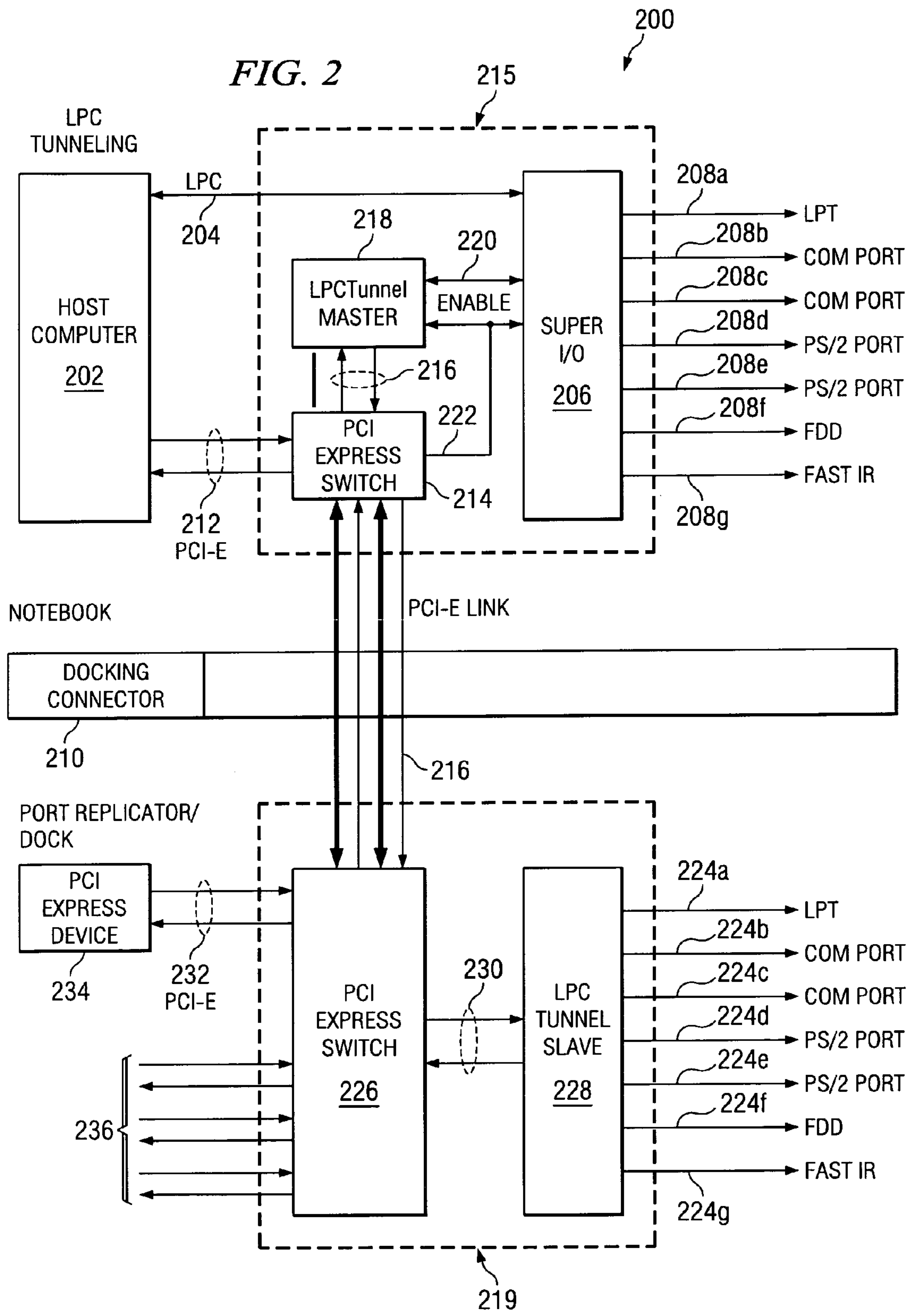
FIG. 2 is a general block diagram of a modified PCI_Express fabric utilizing the present invention.

FIG. 2 illustrates the concept of the present invention generally as 200. In the present invention, the LPC Transaction Packets are "tunneled" across the docking connector by means of the PCI_Express link. Data packets are formed which are compatible with PCI_Express to carry the port I/O commands from the LPC bus. These new packets are inserted into the PCI_Express traffic on a space available basis and carried across a "tunnel" of the PCI_Express link to the port replicator on the docking station. The Super I/O registers remain in the notebook or laptop computer and are replicated in the LPC tunnel slave in the docking station.

Figure 1:
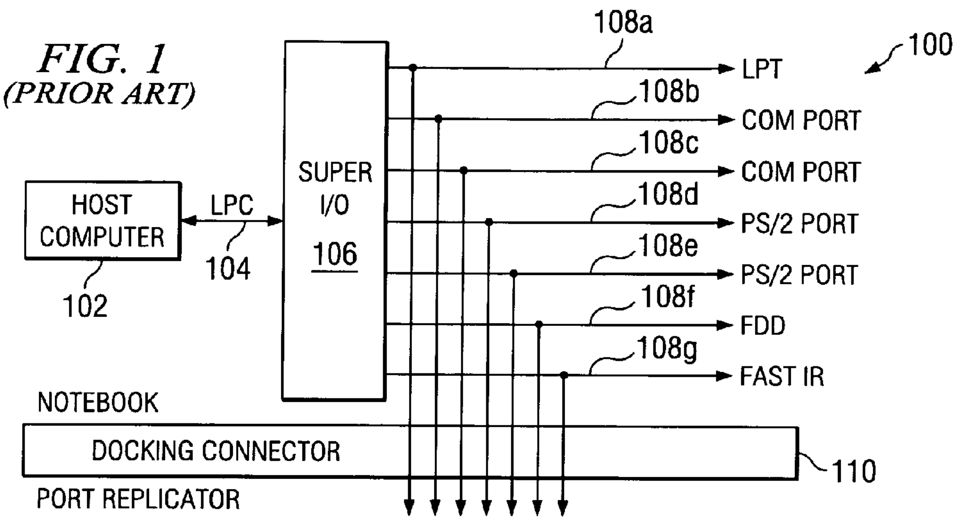
FIG. 1 is a block diagram of a prior art implementation of connecting the Super I/O of a portable computer to a docking station.

Referring to FIG. 2, the LPC bus 204 couples the host computer 202 to the Super I/O chip 206, as in FIG. 1. The Super I/O chip has the same outputs 208*a*–208*g* as a Super I/O chip 106 has in FIG. 1. An LPC tunnel master 218 is coupled by enable bus 220 and data bus 222 to the Super I/O chip 206. The LPC tunnel master is coupled via lines 216 to the PCI_Express switch 214 which is also coupled to the host computer 202 via PCI_Express link 212. PCI_Express switch 214 is coupled via PCI_Express link 216 across the docking connector 210 to the port replicator in the docking station. PCI_Express link 216 terminates in PCI_Express switch 226 which is coupled via PCI_Express link 230 to the LPC tunnel slave 228. LPC tunnel slave 228 has outputs 224*a*–224*g* which are identical to the outputs 208*a*–208*g* of the Super I/O chip 206. The PCI_Express switch 226 also has a PCI_Express link 232 to a PCI_Express device 234 which could be a hard disk drive, for example. The other PCI_Express links 236 can go to other portions of the PCI_Express fabric which maybe PCI_Express devices or PCI_Express switches (not shown), in accordance with the PCI_Express standard. Thus, the upstream circuit 215 "tunnel" the data on the LPC bus 204 to the downstream circuit 219 via the PCI_Express link 216. The PCI_Express switch 226 will strip out the PCI_Express packetized LPC Transaction Packets and send them via link 230 to the LPC tunnel slave 228. The LPC tunnel slave 228 then performs the same functions performed by the Super I/O chip 206. The PCI_Express fabric is completely unaffected by the merge of LPC packet data by the LPC tunnel master and after the de-merge by the PCI_Express switch. One reason why this system works, is the very low speed of LPC transactions. The LPC bus still utilizes an 8 MHz clock speed. Although the clock speeds the CPU have increased dramatically over the years, the clock speed of the LPC bus has remained the same, because the physical limitations implicit in the peripheral devices would make them unable to utilize a higher clock speed, thus the cost of rewriting the BIOS has been avoided. The PCI_Express will initially run at a 2.5 GHz clock speed and could eventually hit 40 GHz clock speeds. Therefore, there is sufficient bandwidth in the PCI_Express fabric to handle the slow LPC bus Transaction Packets without adversely affecting the PCI_Express fabric traffic. Other considerations, however, are discussed herein below.

Figure 3:
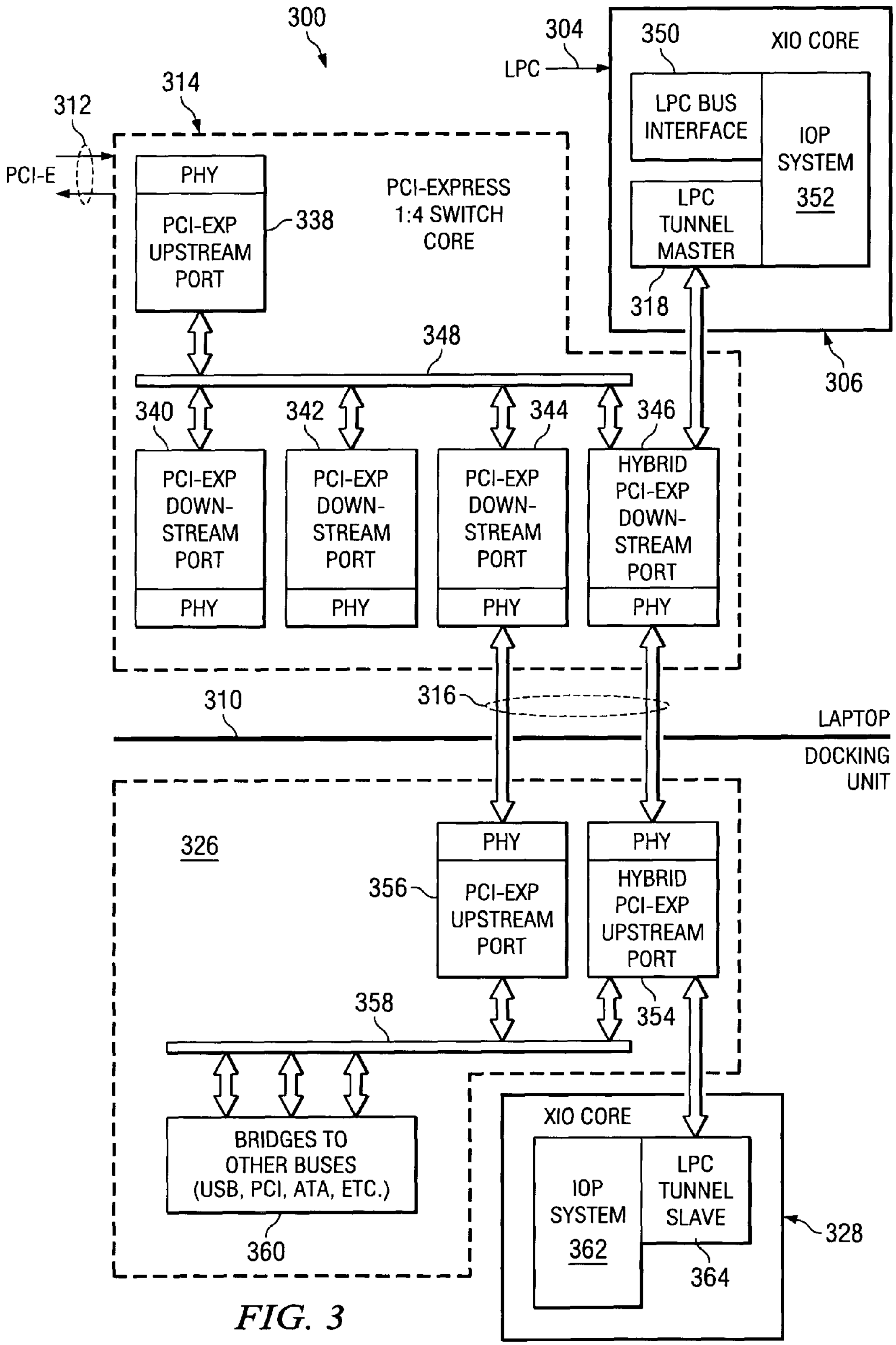
FIG. 3 is a more detailed block diagram of the system of FIG. 2.

FIG. 3 illustrates a more detailed drawing of the general implementation of the present invention shown in FIG. 2, generally shown as 300. The LPC bus 304 is the LPC bus 104 and 204 shown in the previous figures. It is coupled to block 306 which takes the place of the Super I/O chip 206 in FIG. 2. Block 306 contains an LPC bus interface 350 which is coupled to IOP system 352 which takes the place of the Super I/O chip 206. Coupled to the IOP system 352 is the LPC tunnel master 318 which corresponds the tunnel master 218 of FIG. 2. The PCI_Express link 312 corresponds to the link 212 shown in FIG. 2. It is coupled to a PCI_Express upstream port 338 which, as is known to those skilled in the art, has a physical layer as shown in the drawings. The PCI_Express upstream port 338 is coupled to a switch 348 which is also coupled to three PCI_Express downstream ports 340, 342 and 344. Each of the PCI_Express downstream ports has its own physical layer. The PCI_Express 1:4 switch core 314 also has a hybrid PCI_Express downstream port 346 coupled to the switch 348. The switch 348 allows the PCI_Express upstream port 338 to communicate with any of the PCI_Express downstream ports 340, 342, 344 and the hybrid PCI_Express downstream port 346, one at a time. It does not permit one of the downstream ports 340, 342, 344 or 346 to communicate with each other, however. Each of the downstream ports also has their respective physical layer.

The hybrid PCI_Express downstream port 346 is also coupled via a link to the LPC tunnel master 318. The PCI_Express downstream port 344 and the hybrid PCI_Express downstream port 346 are each coupled via a link 316 to the PCI_Express downstream circuit 326 in the docking station. The PCI_Express downstream port 344 is coupled to the PCI_Express upstream port 356 and the hybrid PCI_Express downstream port 346 is coupled to the hybrid PCI_Express upstream port 354. Each of the upstream ports 354, 356 has their respective physical layer and each is coupled via links to the end point 358. End point 358 can be coupled to links to bridges to other buses such as a USB bus, PCI bus, or an ATA bus via bridges 360. The hybrid PCI_Express upstream port 354 is also coupled via a link to the XIO core 328 which comprises LPC tunnel slave 364 and IOP system 362. The PCI_Express downstream ports 340, 342 can be connected to other devices, such as a hard disk (not shown).

In operation, PCI_Express traffic on link 312 can be transmitted downstream to the PCI_Express upstream port 338 and through the switch 348 to one of the downstream ports 340, 342 or 344. The downstream port 344 transmits data over the PCI_Express link 316 to the PCI_Express upstream port 356 located in the docking station. Data can also be transmitted downstream from the PCI_Express upstream port 338 through the hybrid PCI_Express downstream port 346 through the PCI_Express line 316 to the hybrid PCI_Express upstream port 354. Up to this point, the PCI_Express fabric functions as it normally would.

If an LPC Transaction Packet arrives in the LPC bus interface 350 via LPC bus 304, the IOP system 352 will both separate out the commands onto the output lines such as output lines 208*a*–208*g* in FIG. 2 (not shown in FIG. 3) and configure the LPC bus Transaction Packets into a packet form that can be inserted into the PCI_Express traffic. The packets produced by the IOP system 352 are fixed precise packets which have almost the same length regardless of the transaction that is to be performed. This enables the packet to be inserted by the LPC tunnel master 318 into the PCI_Express traffic when there is space available. This is because the amount of time necessary to insert the hybrid PCI_Express packet will essentially be fixed for any of these hybrid packets. Thus, the tunnel master will know how much time is available to process out packets stored in its queue for transmission if a hybrid packet is inserted into the PCI_Express traffic. If sufficient time is not available, then the hybrid PCI_Express packet will wait until a slot is available. As explained above, because of the low data rate on the LPC bus and the high data rate on the PCI_Express fabric, this should not be a conflict. Once a time slot is available, the LPC tunnel master instructs the hybrid PCI_Express downstream port to insert this packet into its traffic stream which is then output across link 316 to the hybrid PCI_Express upstream port 354. The hybrid PCI_Express upstream port 354 strips out the non-PCI_Express defined transactions that are unique to the present invention and sends them via a link to the XIO core 328. The LPC tunnel slave 364 and XIO core 328 receive a stripped out packet and the IOP system 362 generates outputs on control lines such as control lines 224*a*–224*g* shown in FIG. 2 (not shown in FIG. 3) to drive the appropriate peripheral device.

As shown, the hybrid PCI_Express downstream port 346 and its link 316 and hybrid PCI_Express upstream port 354 can be utilized for overflow traffic from the remainder of the PCI_Express fabric. It can be utilized as needed to transmit the LPC Transaction Packet data. However, the present system only requires the utilization of a hybrid PCI_Express downstream port and a hybrid PCI_Express upstream port. The remaining PCI_Express downstream ports 340, 342 and 344 and additional PCI_Express downstream port 356 can be omitted from the system while still practicing the present invention.

Table 1 below is a list of all the LPC related hybrid transactions that are inserted into and removed from the PCI_Express fabric topology in the two hybrid ports. The LPC transactions are inserted into and removed from the PCI_Express fabric topology in a transaction layer of the two hybrid ports.

TABLE 1

| LPC Transaction | Transaction Type | Origination | PCI-E packets |
|---|---|---|---|
| LPC I/O Read | Bi-directional | Tunnel Master | LPC-TO/LPC-TT |
| LPC I/O Write | Uni-directional | Tunnel Master | LPC-UD downstream |
| LPC Memory Read | Bi-directional | Tunnel Master | LPC-TO/LPC-TT |
| LPC Memory Write | Uni-directional | Tunnel Master | LPC-UD downstream |
| LPC DMA Write to Host | Bi-directional | Tunnel Master | LPC-TO/LPC-TT |
| LPC DMA Read from Host | Uni-directional | Tunnel Master | LPC-UD downstream |
| LPC DMA Request | Uni-directional | Tunnel Slave | LPC-UD upstream |
| LPC SERIRQ Request | Uni-directional | Tunnel Slave | LPC-UD upstream |

As shown in Table I, there are only eight types of LPC transactions. Three LPC transactions are downstream uni-directional only transactions that flow from the LPC tunnel master to the LPC tunnel slave. Two LPC transactions are uni-directional upstream transactions and only flow from the LPC tunnel slave to the LPC tunnel master. All uni-directional LPC transactions are formatted into the LPC uni-directional (LPC-UD) PCI_Express transaction packets. There are also three LPC transactions that are bi-directional. All bi-directional LPC transactions have to be divided into two PCI_Express transactions. One packet is the LPC transaction origination (LPC-TO) packet and the other is the LPC transaction termination (LPC-TT) packet. All the LPC-TO packets flow downstream from the LPC tunnel master to the LPC tunnel slave and all the LPC-TT packets flow upstream form the LPC tunnel slave to the LPC tunnel master. A total of eleven different PCI_Express transactions packets are required to accommodate the eight different types of LPC transactions. The LPC tunnel master will generate the LPC-TO and LPCUD downstream PCI_Express packets and the LPC tunnel slave will generate the LPC-TT and the LPC-UD upstream PCI_Express packets. PCI_Express packets created by the tunnel master or the tunnel slave are injected into the PCI_Express data stream by the sourcing hybrid PCI_Express port and stripped out of the PCI_Express data stream by the receiving PCI_Express port. The hybrid PCI_Express downstream port will source LPC-UD downstream and LPC-TO packets. The hybrid PCI_Express upstream port will source LPC-UD upstream and LPC-TT packets. As stated above, LPC transactions packets do not fit within a PCI_Express data stream and thus the LPC transaction data packets need to be repackaged. The differences between these two systems is explained below.

PCI_Express Transaction Data Packets are formatted into traditional communication like data packets and use a traditional communication oriented transaction protocol. That is to say that data, referred to as the pay load, is rapped with a well defined header and trailer and transferred on the bus as a well defined transaction packet, the data payload being sandwiched between the header and trailer. The transport mechanism has absolutely no interest in the content of the data payload at all. All it cares about is the content of the header and trailer. The header instructs the transport mechanism on how and where to route the transaction data packet and the trailer allows the transport mechanism to verify the transaction data packet reached its destination without being corrupted. A communication oriented transaction protocol focuses on data source and destination points, routing controls, and data corruption prevention. In addition, the PCI_Express Bus is a full-duplexed bus; every PCI_Express Link has one upstream and one downstream channel. The Transmit channel of an Upstream Port connects to the Receive channel of the Downstream Port and the Transmit channel of the Downstream Port connects to the Receive channel of the Upstream Port. The PCI_Express fabric is a switching fabric where every link in the fabric is a point to point link between two ports. Each switch in the fabric has to have two or more ports, one upstream and one or more downstream ports.

LPC Transaction Data Packets on the other hand are bus oriented data packets and use a bus oriented transaction protocol as opposed to being communication oriented like the PCI_Express transactions. A bus oriented transaction focuses only on bus management. A LPC bus is a multi-point bus with one point serving as a controller and all the other points as slaves. Because of the multi-point bus structure of the LPC bus, it can only be a half-duplexed bus at best. Because of this half-duplexed nature of the LPC bus, some LPC Transaction Data Packets are not well defined. The problem is in the bi-directional data packets. The LPC slave does not know what information the LPC controller is requesting until after the controller makes the request. It may take the LPC slave device an undetermined amount of time to collect the information and place it on the bus. Therefore the LPC slave has to indicate to the LPC controller that the LPC Transaction Data Packet has to be stretched out by an undetermined number of transfer clock cycles. In the LPC specifications, the slave LPC inserts "Wait" sync codes into the LPC Transaction Data Packet to do this stretching of the LPC Transaction Data Packet.

Figure 4:
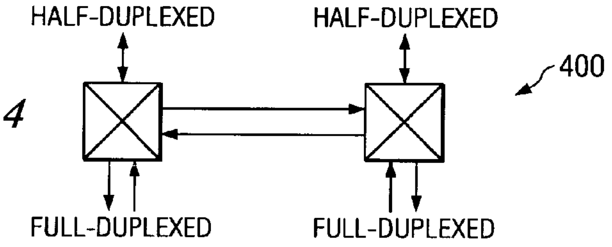
FIG. 4 is a diagrammatic explanation of utilization of half-duplexed and full duplexed signals.

In order to send LPC Transaction Data Packets on a PCI_Express data stream, the circuit must merge the half-duplexed oriented data packets into a full-duplexed oriented data stream and then de-merge the data back into half-duplex data packets on the other side of the full-duplex link. A full-duplexed oriented data packet is a one directional data packet. The data packet is either directed downstream or upstream. A half-duplexed oriented data packet is a bi-directional packet. The bus may reverse directions in the middle of the data packet. For example, the controller may request data from a slave device. The data packet starts by the controller directing addressing information downstream and ends with the slave sending data back upstream. FIG. 4 illustrates the problem graphically.

In order to solve this problem the half-duplexed oriented data packet has to be partitioned into two full-duplexed oriented data packets. Taking into account the dynamics of bus behavior, once a half-duplexed oriented data packet is partitioned into full-duplexed oriented data packets, the two derived full-duplexed data packets can and most certainly will become disjointed. By disjointed, we mean that the down stream full-duplexed and the upstream full-duplexed halves derived from the one half-duplexed data packet may be separated by a number of data packet transfer cycles and an undetermined time period on the full-duplexed link between the merger and de-merger points. The present invention must rejoin the two full-duplex halves so that the full-duplexed link between the merger and the de-merger points will become transparent to the two half-duplexed buses on each side of the full-duplexed link.

The Slave LPC device can not originate LPC Data Transaction Packets. Sideband signals are used to generate DMA requests and Serial IRQ requests. Therefore there are no DMA Request or Serial IRQ request LPC Data Transaction Packets. However, sideband signals generated by peripherals connected to a docking station cannot get across the PCI_Express link to the LPC controller. Therefore the LPC Tunnel Slave has to translate these sideband signals into LPC-UD Upstream PCI_Express Data Transaction Packets and inject then into the PCI_Express fabric in the Hybrid PCI_Express Upstream Port.

The LPC Tunnel Master generates all LPC-UD Downstream PCI_Express Data Transaction Packets. The three unidirectional LPC Data Transaction Packets that are translated into LPC-UD Downstream PCI_Express Data Transaction Packets are LPC I/O Write, LPC Memory Write, and LPC DMA Read from Host. Table 2 shows the data format of each of these three LPC Data Transaction Packets before it is translated into an LPC-UD PCI_Express Data Transaction Packet. Each unit is a nibble (4-bit) of information and each unit consumes one transfer Clock cycle on the LPC bus. Not only are the three unidirectional LPC Data Transaction Packets different in unit count, but each may have additional "Sync" units added (see explanation below). Thus there is no way to predetermine the size of each given unidirectional LPC Data Transaction Packets. This complicates inserting the packets into a PCI_Express data stream since the tunnel master would have to determine the time required for each variation of the packet.

TABLE 2

| LPC Transaction | Unit 0 | Unit 1 | Unit 2 | Unit 3 | Unit 4 | Unit 5 | Unit 6 | Unit 7 | Unit 8 | Unit 9 | Unit 10 | Unit 11 | Unit 12 | Unit 13 |
|---|---|---|---|---|---|---|---|---|---|---|---|---|---|---|
| LPC I/O Write | Start | T/D | Address(16-bits) | | | | Data(8-bits) | | CTAR | | Sync | PTAR | | |
| LPC Mem Write | Start | T/D | Address (32-bits) | | | | | | | | Data (8-bits) | | CTAR | |
| LPC DMA Rd | Start | T/D | Ch | Size | Data (8-bits) | | CTAR | | Sync | PTAR1 | | Data (8-bits) | | CTAR |

| LPC Transaction | Unit 14 | Unit 15 | Unit 16 | Unit 17 | Unit 18 | Unit 19 | Unit 20 | Unit 21 | Unit 22 | Unit 23 | Unit 24 | Unit 25 | Unit 26 |
|---|---|---|---|---|---|---|---|---|---|---|---|---|---|
| LPC I/O Write | | | | | | | | | | | | | |
| LPC Mem Write | Sync | PTAR | | | | | | | | | | | |
| LPC DMA Rd | CTAR | Sync | PTAR2 | | Data(8-bits) | | CTAR | | Sync | PTAR | | Data(8-bits) | |

| LPC Transaction | Unit 27 | Unit 28 | Unit 29 | Unit 30 | Unit 31 | Unit 19 | Unit 20 | Unit 21 | Unit 22 | Unit 23 | Unit 24 | Unit 25 | Unit 26 |
|---|---|---|---|---|---|---|---|---|---|---|---|---|---|
| LPC I/O Write | | | | | | | | | | | | | |
| LPC Mem Write | | | | | | | | | | | | | |
| LPC DMA Rd | CTAR | | Sync | PTAR 3 | | | | | | | | | |

TAR is an acronym for bus Turn ARound. Every time the data flow direction has to turn around on the LPC bus, two transfer clock cycles are lost to bus turn around time. The CTAR units are when the data flow direction is changing from "controller to peripheral" to "peripheral to controller". The PTAR units are when the data flow direction is changing from "peripheral to controller" to "controller to peripheral". A LPC DMA Read Data Transfer operation may terminate at the end of PTAR1 (one byte transfer), PTAR2 (two byte transfer), or PTAR3 (four byte transfer), depending on the value in the "Size" (Unit 3) nibble. The Channel (Unit 2) of the LPC DMA Read Data Transfer operation identifies which DMA channel is being used. Up to 8 DMA channels may be active at one time.

Every LPC Data Transfer operation starts with a "Start Cycle" (Unit 0) and a "Cycle Type and Direction" (Unit 1) and ends with a "Sync" and two "PTAR" clock cycles. The "Sync" nibble is a code issued by the peripheral device signaling back to the controller when it has accepted the LPC Data Transfer Packet. There are different Sync codes. A "Ready" Sync code indicates the transfer operation can be terminated normally. A peripheral device will issue "Wait" Sync codes, indicates it is unable to terminate the transfer operation in a normal transfer operation time period, until it is able to terminate the operation. The peripheral can also issue "Error" sync codes to terminate the operation abnormally.

The remaining LPC Data Transaction Packets are the bi-directional packets. In bi-directional packets the peripheral device must drive information (usually data) onto the LPC bus between the Sync and the first PTAR unit. This is equivalent to inserting information units into the data packet. Table 3 shows all three bi-directional LPC Data Transfer Packets. Like the unidirectional LPC Data Transaction Packets, not only is each of the three bi-directional LPC Data Transaction Packets different in unit count, but each may also have additional "Sync" units added. Thus there is no way to predetermine the size of each given bi-directional LPC Data Transaction Packets, either.

A LPC DMA Write transaction will either terminate after the PTAR1 clock cycles or else the PTAR1 cycle will be omitted. The same rule applies to the other PTAR clock cycles. The LPC DMA Write operation, after the CTAR clock cycles, will be an alternation between Sync cycles and Data cycles until all the data is transferred and the PTAR cycles will be the last two cycles of the operation. A LPC DMA Write transaction may transfer 8-bit, 16-bit, or 32-bit data packets only.

All LPC Data Transaction Packets and all LPC sideband signaling will be translated into "Msg" type PCI_Express Vendor_Defined Message Transaction Layer Packets (TLP). A "Msg" type Vendor-Defined Message TLP has only a 16-byte header, no TLP payload and no TLP Digest. Tables 4–10 define the 16-byte header of the "Msg" TLP packet translated from a LPC Data Transaction packet. The tables show the TLP header in byte order and the bit order of each byte. The definitions of the bit fields are defined in the "Definition row of each table. Each table contains two full bytes of bit information, requiring 8 tables to define all the bits in the 16-byte TLP header. All bit fields labeled with a designator "R" are reserved bit fields and will always be set to zero.

The first 12 bytes of the TLP header are in the same format for all the "Msg" TLP packets. Following each table is a list of the definitions defined in the "Definition" row of each table.

TABLE 3

| LPC Transaction | Unit 0 | Unit 1 | Unit 2 | Unit 3 | Unit 4 | Unit 5 | Unit 6 | Unit 7 | Unit 8 | Unit 9 | Unit 10 | Unit 11 | Unit 12 | Unit 13 |
|---|---|---|---|---|---|---|---|---|---|---|---|---|---|---|
| LPC I/O Read | Start | T/D | Address(16-bits) | | | | CTAR | | Sync | Data(8-bits) | | PTAR | | |
| LPC Mem Read | Start | T/D | Address (32-bits) | | | | | | | | CTAR | | Sync | Data |
| LPC DMA Wrt | Start | T/D | Ch | Size | CTAR | | Sync | Data (8-bits) | | PTAR1 | | Sync | Data(8-bits) | |

| LPC Transaction | Unit 14 | Unit 15 | Unit 16 | Unit 17 | Unit 18 | Unit 19 | Unit 20 | Unit 21 | Unit 22 | Unit 23 | Unit 24 | Unit 25 | Unit 26 |
|---|---|---|---|---|---|---|---|---|---|---|---|---|---|
| LPC I/O Read | | | | | | | | | | | | | |
| LPC Mem Read | Data | PTAR | | | | | | | | | | | |
| LPC DMA Wrt | PTAR2 | | Sync | Data(8-bits) | | PTAR | | Sync | Data(8-bits) | | PTAR3 | | |

TABLE 4

| Byte order | 0 | | | | | | | | 1 | | | | | | | |
|---|---|---|---|---|---|---|---|---|---|---|---|---|---|---|---|---|
| Bit order | 7 | 6 | 5 | 4 | 3 | 2 | 1 | 0 | 7 | 6 | 5 | 4 | 3 | 2 | 1 | 0 |
| Definition | R | Fmt | | Type | | | | | R | TC | | | R | | | |
| Setting | 0 | 0 | 1 | 1 | 0 | 0 | 1 | 0 | 0 | 0 | 0 | 0 | 0 | 0 | 0 | 0 |
| Byte order | 2 | | | | | | | | 3 | | | | | | | |
| Bit order | 7 | 6 | 5 | 4 | 3 | 2 | 1 | 0 | 7 | 6 | 5 | 4 | 3 | 2 | 1 | 0 |
| Definition | TD | EP | Attr | | R | | Length | | | | | | | | | |
| Setting | 0 | 0 | 0 | 0 | 0 | 0 | 0 | 0 | 0 | 0 | 0 | 0 | 0 | 0 | 0 | 0 |
| Byte order | 4 | | | | | | | | 5 | | | | | | | |
| Bit order | 7 | 6 | 5 | 4 | 3 | 2 | 1 | 0 | 7 | 6 | 5 | 4 | 3 | 2 | 1 | 0 |
| Definition | Requestor ID | | | | | | | | | | | | | | | |
| Setting | 1 | 1 | 1 | 1 | 1 | 1 | 1 | 1 | d | d | d | d | d | f | f | f |

TABLE 4-continued

| Byte order | 6 | | | | | | | | 7 | | | | | | | |
|---|---|---|---|---|---|---|---|---|---|---|---|---|---|---|---|---|
| Bit order | 7 | 6 | 5 | 4 | 3 | 2 | 1 | 0 | 7 | 6 | 5 | 4 | 3 | 2 | 1 | 0 |
| Definition | Tag | | | | | | | | Message Code | | | | | | | |
| Setting | t | t | t | t | t | t | t | t | 0 | 1 | 1 | 1 | 1 | 1 | 1 | 1 |
| Byte order | 8 | | | | | | | | 9 | | | | | | | |
| Bit order | 7 | 6 | 5 | 4 | 3 | 2 | 1 | 0 | 7 | 6 | 5 | 4 | 3 | 2 | 1 | 0 |
| Definition | Destination ID | | | | | | | | | | | | | | | |
| Setting | 1 | 1 | 1 | 1 | 1 | 1 | 1 | 1 | d | d | d | d | d | f | f | f |
| Byte order | 10 | | | | | | | | 11 | | | | | | | |
| Bit order | 7 | 6 | 5 | 4 | 3 | 2 | 1 | 0 | 7 | 6 | 5 | 4 | 3 | 2 | 1 | 0 |
| Definition | Vendor ID | | | | | | | | | | | | | | | |
| Setting | v | v | v | v | v | v | v | v | v | v | v | v | v | v | v | v |

The following definitions relate to the Definition line of Table 4:

Fmt: Format of TLP packet

01: defines a TLP packet with a 16-byte header and no data payload. (i.e. a Msg Type)

Type: Defines the Type and routing controls for the TLP packet

10010: All TLP packets translated from LPC Data Transaction packets will be defined as “Messages routed by ID”.

TC: Traffic Class

0: All Message TLP use a Traffic Class of TC=0.

TD: TLP Digest Option controls

0: All TLP packets translated from LPC Data Transaction packets will not have a TLP Digest at the end of the TLP packet.

EP: Indicates the TLP is poisoned

All TLP packets translated from LPC Data Transaction packets will not use this indication and EP will always be set to zero.

Attr: TLP Traffic Management Attributes

These bits are always set to zero for Vendor_Defined TLP Messages.

Length: Data payload size

For TLP packets with data payloads this bit field defines the number of 32-bit data units that are in the data payload.

0000000000: Indicates no Data payload.

Requestor ID: Identification Code of PCI_Express user generating the TLP packet.

The Requestor ID of all TLP packets translated from LPC Data Transaction packets will have the form of 11111111dddddfff.

The 8 msb bits will be set to ones to indicate that this is a TLP packet translated from a LPC Data Transaction packet.

The next five bits will indicate data flow direction.

ddddd=11111: indicate the Tunnel Master is the source of the TLP packet.

ddddd=00000: indicate the Tunnel Slave is the source of the TLP packet.

The 3 lsb bits will indicate the LPC packet type.

fff=000: indicates the TLP packet is a LPC SERIRQ Request packet sourced from the Tunnel Slave.

fff=001: indicates the TLP packet is a LPC DMA Request packet sourced from the Tunnel Slave.

fff=010: indicates the TLP packet is a LPC I/O Write packet sourced from the Tunnel Master.

fff=100: indicates the TLP packet is a LPC Memory Write packet sourced from the Tunnel Master.

fff=110: indicates the TLP packet is a LPC DMA Read from Host packet sourced from the Tunnel Master.

fff=011: indicates the TLP packet is a LPC I/O Read packet.

For LPC-TO I/O Read Packets the sources of the TLP is the Tunnel Master.

For LPC-TT I/O Read Packets the sources of the TLP is the Tunnel Slave.

fff=101: indicates the TLP packet is a LPC Memory Read packet.

For LPC-TO Memory Read Packets the sources of the TLP is the Tunnel Master.

For LPC-TT Memory Read Packets the sources of the TLP is the Tunnel Slave.

fff=111: indicates the TLP packet is a LPC DMA Write to Host packet.

For LPC-TO DMA Write packets the sources of the TLP is the Tunnel Master.

For LPC-TT DMA Write packets the sources of the TLP is the Tunnel Slave.

Tag: TLP Tag

An 8-bit value generated by the Requestor that allows the disjointed LPC Data Transaction packet to be tracked and rejoined outside the PCI_Express fabric. All LPC-UD Data Transaction Packet will be assigned a Tag value of zero. All LPC-TO Data Transaction packet will be assigned a unique Tag value by the Tunnel Master. Up to 31 LPC-TO Data Transaction packets may be assigned at any given time because there are 31 unique Tag values. When the Tunnel Slave responds to an LPC-TO Data Transaction packet by generating a LPC-TT Data Transaction packet, it will assign the same Tag value to the LPC-TT packet that was in the LPC-TO packet. This way the Tunnel Master will be able to rejoin the LPC-TT packet to the LPC-TO packet to complete the LPC transaction by matching the Tag values.

Message Code: Vendor_Defined Message Code

The Vendor-Defined Message Code of “0111 1111” instructs any receiving port to silently discard the TLP and not propagate it through to the next switch in the PCI_Express fabric if it is not the destination port. This is a safe guard to insure that a translated LPC Data Transaction packet will not leak out of the hybrid link into the rest of the PCI_Express fabric. Destination ID: Identification Code of PCI_Express user that is the target of the TLP packet. The Destination ID of all TLP packets translated from LPC Data Transaction packets will have the form of 11111111dddddfff. See the explanation given for the Requestor ID definition to understand the content of "ddddd" and "fff". For Destination ID "ddddd" indicates the target destination (Tunnel Slave=00000 and Tunnel Master=11111).

Vendor ID: ID code assigned to the vendor by the PCI_Express Committee.

Each vendor is assigned a unique Vendor ID code. This allows the packet to be broadcast on a PCI_Express fabric while having only predetermined ports or switches respond.

The format of the last four bytes of the TLP header will be TLP type dependent. The information being transported in the TLP has to be in the last four bytes of the TLP header. Tables 5 and 6 show the data format of the last four bytes of the TLP header of a LPC SERIRQ Request TLP packet.

TABLE 5

| Byte order | | | | 12 | | | | | | | | | 13 | | | |
|---|---|---|---|---|---|---|---|---|---|---|---|---|---|---|---|---|
| Bit order | 7 | 6 | 5 | 4 | 3 | 2 | 1 | 0 | 7 | 6 | 5 | 4 | 3 | 2 | 1 | 0 |
| Definition | IRQ[15:0] States | | | | | | | | | | | | | | | |
| Setting | x | x | x | x | x | x | x | x | x | x | x | x | x | x | x | x |

TABLE 6

| Byte order | | | | 14 | | | | | | | | | 15 | | | |
|---|---|---|---|---|---|---|---|---|---|---|---|---|---|---|---|---|
| Bit order | 7 | 6 | 5 | 4 | 3 | 2 | 1 | 0 | 7 | 6 | 5 | 4 | 3 | 2 | 1 | 0 |
| Definition | Reserved | | | | | | | | | | | | | | | |
| Setting | 0 | 0 | 0 | 0 | 0 | 0 | 0 | 0 | 0 | 0 | 0 | 0 | 0 | 0 | 0 | 0 |

IRQ[15:0] States: States of each of the 15 IRQ signals that are encoded on the LPC SERIAL IRQ signal.

Each bit in bytes 12 and 13 represent the state of one of the IRQ interrupt periods of a Serial IRQ frame period. If the assigned IRQ is active, the bit will be high. If the assigned IRQ is inactive, the bit will be low.

Tables 7 and 8 show the data format of the last four bytes of the TLP header of a LPC DMA Request TLP packet.

TABLE 7

| Byte order | | | | 12 | | | | | | | | | 13 | | | |
|---|---|---|---|---|---|---|---|---|---|---|---|---|---|---|---|---|
| Bit order | 7 | 6 | 5 | 4 | 3 | 2 | 1 | 0 | 7 | 6 | 5 | 4 | 3 | 2 | 1 | 0 |
| Definition | R | | | | ChanID | | | A | R | | | | | | | |
| Setting | 0 | 0 | 0 | 0 | 0 | 0 | 0 | 0 | 0 | 0 | 0 | 0 | 0 | 0 | 0 | 0 |

TABLE 8

| Byte order | | | | 14 | | | | | | | | | 15 | | | |
|---|---|---|---|---|---|---|---|---|---|---|---|---|---|---|---|---|
| Bit order | 7 | 6 | 5 | 4 | 3 | 2 | 1 | 0 | 7 | 6 | 5 | 4 | 3 | 2 | 1 | 0 |
| Definition | Reserved | | | | | | | | | | | | | | | |
| Setting | 0 | 0 | 0 | 0 | 0 | 0 | 0 | 0 | 0 | 0 | 0 | 0 | 0 | 0 | 0 | 0 |

ChanID: DMA channel ID

When a device makes a DMA request, it must provide a DMA channel number so that the DMA controller may determine which of the eight DMA channels to allocate to this device.

Tables 9 and 10 show the data format of the last four bytes of the TLP header of an LPC-TO or an LPC-TT TLP packet.

TABLE 9

| Byte order | 12 | | | | | | | | 13 | | | | | | | |
|---|---|---|---|---|---|---|---|---|---|---|---|---|---|---|---|---|
| Bit order | 7 | 6 | 5 | 4 | 3 | 2 | 1 | 0 | 7 | 6 | 5 | 4 | 3 | 2 | 1 | 0 |
| Definition | | | | Data 0 | | | | | | | | Data 1 | | | | |
| Setting | x | x | x | x | x | x | x | x | x | x | x | x | x | x | x | x |

TABLE 10

| Byte order | 14 | | | | | | | | 15 | | | | | | | |
|---|---|---|---|---|---|---|---|---|---|---|---|---|---|---|---|---|
| Bit order | 7 | 6 | 5 | 4 | 3 | 2 | 1 | 0 | 7 | 6 | 5 | 4 | 3 | 2 | 1 | 0 |
| Definition | | | | Data 3 | | | | | | | | Data 4 | | | | |
| Setting | x | x | x | x | x | x | x | x | x | x | x | x | x | x | x | x |

DataN

Not all LPC-TT type TLP packets will use all four Data bytes. Data Bytes that are used by the TLP packet will be set to zero.

The Tunnel Master has to determine which data packets on the LPC Bus need to be directed through the Tunnel Master onto the Hybrid PCI_Express Link to the Tunnel Slave. The LPC Bus is a multi-point bus and other devices may be sharing the LPC bus with the Tunnel Master. Monitoring the LPC Bus and selectively directing traffic through the Tunnel Master is just one of the responsibilities of the LPC Packet Manager inside the Tunnel Master. Once the LPC Packet Manager determines that a LPC Data Packet should be translated into a PCI_Express TLP Data Packet, it has to determine what type TLP data packet to translate it to and instruct the LPC-to-PCI_Express Translator accordingly.

Figure 5:
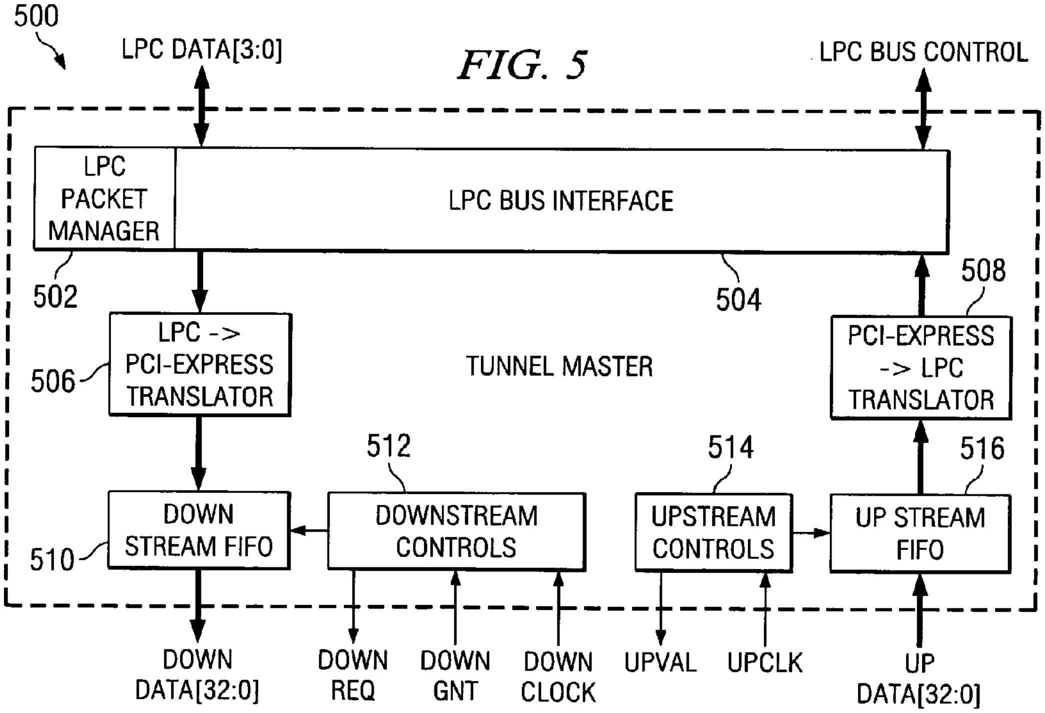
FIG. 5 is a more detailed block diagram of the LPC tunnel master.

FIG. 5 is a block diagram of the tunnel master, generally shown as 500. The LPC packet manager 502 is coupled to the LPC bus interface 504. The LPC bus interface 504 receives the LPC bus control signal and a 3 bit LPC data signal [3:0]. The output of the LPC bus interface 504 is coupled to the LPC to PCI_Express translator 506 which has an output coupled to the downstream FIFO queue 510 which transmits 32 bits [32:0] of data downstream as a PCI_Express packet. FIFO 510 is responsive to the output of downstream controls 512 which receives the signals down GNT and the DownClock and outputs a down request signal. On the upstream side, upstream controls 514 receives the up clock signal, outputs an up value signal and controls the upstream FIFO queue 516. Upstream FIFO 516 receives the 32 bit [32:0] bit stream and under the control of upstream controls outputs the received data to the PCI_Express LPC translator 508 which outputs the translated data to the LPC bus interface 504. The circuitry for the blocks shown in FIG. 5 is well known to those skilled in the art and need not be shown in detail here.

For unidirectional LPC Transaction Data Packets, the LPC Packet Manager will issue the "Ready" Sync and PTAR clock cycles on the LPC bus to complete the LPC Data Transaction Packet. The LPC Packet Manager will direct the input LPC information on the LPC Data bus to the LPC→PCI_Express Translator when it is translated into a LPC-UD Downstream PCI_Express TLP packet.

For bi-directional LPC Transaction Data Packets, the LPC Packet Manager instructs the LPC-to-PCI_Express Translator to generate LPC-TO PCI_Express TLP packets. The LPC Packet Manager will then issue on the LPC Bus "Long Wait" Sync clock cycles until the PCI_Express-to-LPC Translator receives the returned matching LPC_TT PCI_Express TLP packet. The LPC Packet Manager will then clock the data the PCI_Express-to-LPC Translator extracts out of the LPC-TT TLP packet onto the LPC bus and terminate the LPC transaction with the appropriate PTAR clock cycles. If the LPC Packet Manager does not receive a matching LPC-TT packet in a defined period of time, the it must terminate the LPC Data Transaction by issuing an "Error" sync and appropriate PTAR clock cycles on the LPC Bus. When the "Requestor ID" of a LPC-TT PCI_Express TLP packet is the same as the "Destination ID" of a LPC_TO PCI_Express TLP and the Tag value of both The LPC-TT and LPC-TO packets are the same, Then the LPC-TT packet is the matching LPC-TT packet of the LPC-TO packet.

The LPC-to-PCI_Express Translator generates the appropriate TLP header. The LPC data for both LPC-UD Downstream and LPC-TO PCI_Express TLP packets are converted from the LPC transaction cycle into TLP Data Payloads. Table 11 shows the content of both the TLP Header of the LPC-UD Downstream and LPC-TO PCI_Express TLP packets. Note that all LPC TLP packets are header only packets that contain no data payload or trailer.

TABLE 11

| 16 Byte Header for LPC-UD Downstream and LPC-TT PCI_Express TLP Data Packet | | | | | | | | | | | | | | | |
|---|---|---|---|---|---|---|---|---|---|---|---|---|---|---|---|
| Byte0 | Byte1 | Byte2 | Byte3 | Byte4 | Byte5 | Byte6 | Byte7 | Byte8 | Byte9 | ByteA | ByteB | ByteC | ByteD | ByteE | ByteF |
| 0x72 | 0x00 | 0x00 | 0x00 | 0xFF | ReqID | tag | 0x7F | 0xFF | DestID | vID | vID | Data0 | Data1 | Data2 | Data3 |

If the LPC Transaction being translated is an LPC I/O Write operation then:

The "ReqID" value in Byte 5 of the Header is 0xFA.

The "DestID" value in Byte 9 of the Header is 0x02.

The "tag" value in Byte 6 of the Header is 0x00.

ByteC "Data0" and ByteD "Data1" is the 16-bit LPC I/O Address extracted from Units 2, 3, 4 and 5 of the LPC bus transaction cycle.

ByteE "Data 2" is the LPC 8-bit Data extracted from units 6 and 7 of the LPC bus transaction cycle.

ByteF is set to 0x00.

If the LPC Transaction being translated is an LPC memory Write operation then:

The "ReqID" value in Byte 5 of the Header is 0xFC.

The "DestID" value in Byte 9 of the Header is 0x04.

The "tag" value in Byte 6 of the Header will contain the 8-bit LPC Data extracted from units 10 and 11 of the LPC bus transaction cycle.

ByteC through ByteF is the LPC 32-bit Memory Address extracted from Units 2, 3, 4, 5, 6, 7, 8, and 9 of the LPC bus transaction cycle.

If the LPC Transaction being translated is an LPC DMA read from host operation then:

The "ReqID" value in Byte 5 of the Header is 0xFE.

The "DestID" value in Byte 9 of the Header is 0x06.

The "length" value in Byte 3 of the Header will be determined by the "Size" value in unit 3 of the LPC bus transaction cycle.

For Size=00: length=0x01

For Size=01: length=0x01

For Size=10: illegal code and no TLP packet is generated

For Size=11: length=0x02

The "tag" value in Byte 6 of the Header contains both the Channel Number (unit 2 of LPC bus transaction cycle) and Transaction Data Size (unit 3 of LPC bus transaction cycle).

ByteC is the first 8-bit LPC Data extracted from units 4 and 5 of the LPC bus transaction cycle.

ByteD is the next 8-bit LPC Data extracted from units 11 and 12 of the LPC bus transaction cycle. (Requires Size to be either 01 or 11).

ByteE and ByteF are the next two 8-bit LPC Data extracted from units 18, 19, 25, and 26 of the LPC bus transaction cycle. (Requires size to be 11)

If the LPC Transaction being translated is an LPC I/O Read operation then:

The "ReqID" value in Byte 5 of the Header is 0xFB.

The "DestID" value in Byte 9 of the Header is 0x03.

The Translator will assign the "tag" value in Byte 6 of the Header.

ByteC and ByteD is the 16-bit LPC I/O Address extracted from Units 2, 3, 4 and 5 of the LPC bus transaction cycle.

If the LPC Transaction being translated is an LPC Memory Read operation then:

The "ReqID" value in Byte 5 of the Header is 0xFD.

The "DestID" value in Byte 9 of the Header is 0x05.

The Translator will assign the "tag" value in Byte 6 of the Header.

ByteC through ByteF is the 32-bit LPC Memory Address extracted from Units 2, 3, 4, 5, 6, 7, 8, and 9 of the LPC bus transaction cycle.

If the LPC Transaction being translated is a DMA Write to Host operation then:

The "ReqID" value in Byte 5 of the Header is 0xFF.

The "DestID" value in Byte 9 of the Header is 0x07.

The Translator will assign the "tag" value in Byte 6 of the Header.

ByteC contains the DMA Channel Number extracted from Units 2 of the LPC bus transaction cycle and the DMA Data transfer size extracted from Units 3 of the LPC bus transaction cycle.

Figure 6:
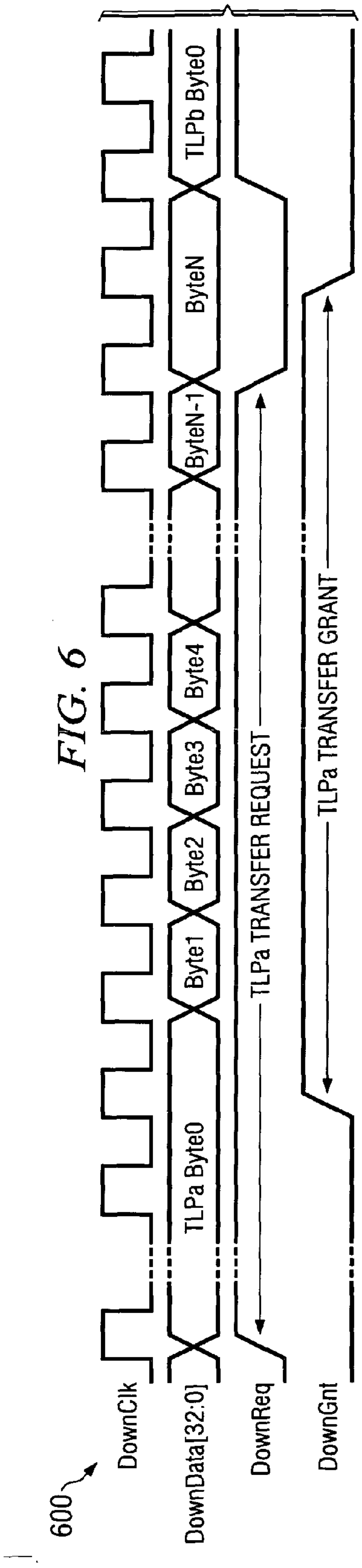
FIG. 6 is a timing diagram with a tunnel master transferring it N byte TLP to the hybrid PCI_Express port.

After the LPC-to-PCI_Express Translator has generated a TLP it will download it into the Downstream FIFO. After the Downstream FIFO has received a full TLP packet from the LPC-to-PCI_Express Translator, it will drive the DownRequest signal active, signaling to the Hybrid PCI_Express Downstream Port that it has a TLP packet to inject into the PCI_Express fabric. Then the Hybrid PCI_Express Downstream Port is able to accept the TLP packet it will drive the DownGrant signal active and will begin accept the TLP data from the Tunnel Master on the next rising edge of the DownClk signal. The Downstream FIFO controls will hold the DownRequest active until the last 32-bits of the TLP packet is being clocked out of the Downstream FIFO. As the last 32-bits of the TLP are placed on the DownData [32:0] bus, the DownRequest signal is de-asserted. The Hybrid PCI_Express Port will de-assert the DownGrant on the next rising edge of the DownClock and will stop clocking data in on this same DownClock cycle. After the Hybrid PCI_Express Port de-asserts the DownGrant, the Tunnel Master is free to make a request for another TLP transfer. A timing diagram illustrating this transfer sequence is shown in FIG. 6 generally as 600.

Figure 7:
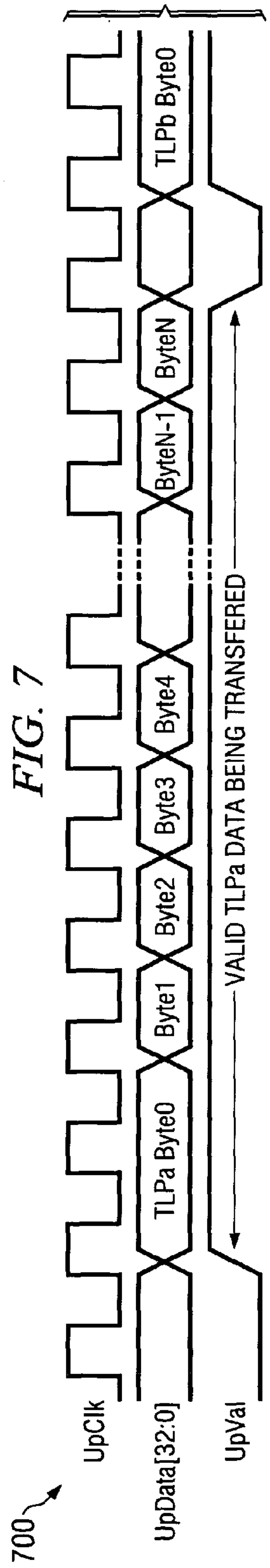
FIG. 7 is a timing diagram of a tunnel master transferring a N byte TLP from the hybrid PCI_Express port.

When the Hybrid PCI_Express Port has received a LPC TLP packet on it's upstream channel, it will remove the TLP from the PCI_Express fabric and send it to the Tunnel Master. The Tunnel Master will clock the TLP into its Upstream FIFO. When the Hybrid PCI_Express Port has a complete LPC TLP packet ready to transfer to the Tunnel Master, it will drive the UpValid signal active. On the first rising edge of the UpClk that the UpVal signal is active, the Tunnel Master's Upstream controls will determine that the Hybrid PCI_Express Port is requesting a TLP transfer. On the next rising edge (the second after UpValid goes active), the Tunnel Master will begin clocking data into the Upstream FIFO. The Tunnel Master will continue clocking the TLP data into the Upstream FIFO as long as UpValid remains active. The Hybrid PCI_Express Port must separate TLP transfers by de-asserting UpValid for at least one UpClk clock cycle after transferring a TLP packet. A timing diagram illustrating this transfer sequence is shown in FIG. 7 generally as 700.

After the Tunnel master receives a full TLP into the Upstream FIFO, it will send the data to the PCI_Express-to-LPC translator. In the PCI_Express-to-LPC translator the TLP header is processed to determine what type of TLP packet it is. Only two types of TLP packets are processed by the PCI_Express-to-LPC translator, LPC-TT and LPC-UD Upstream PCI_Express TLP packets.

For LPC-UD Upstream TLP packets, the PCI_Express-to-LPC translator will have to generate waveforms on some of the LPC Control signals. There are only two kinds of LPC-UD Upstream TLP packets (see the description of the Tunnel Slave below for a detailed description of the LPC-UD Upstream TLP packets), LPC SERIRQ request and LPC DMA Request.

Figure 8:
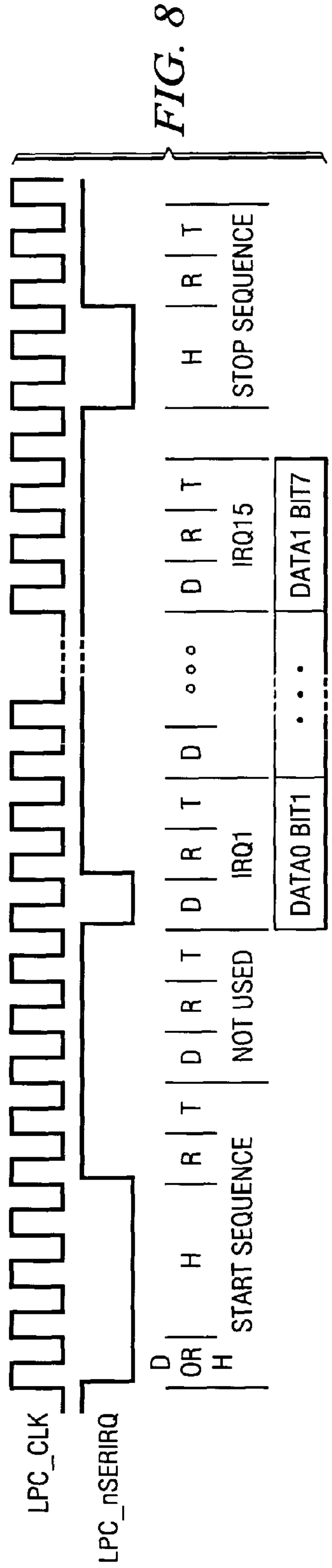
FIG. 8 is a timing diagram for the waveform of an LPC-n SERRIRQ signal.

FIG. 8 shows the waveform of the LPC-nSERIRQ signal. The LPC-nSERIRQ signal is a floating high (connected to Vcc via a full up resistor) open collector signal, meaning that one of several devices may drive it low. In the drawing, the period of time marked as "Start Sequence" is when the LPC Controller is driving the LPC-nSERIRQ signal low to indicate this is the start of a SERIRQ wave train. The period of time marked as "Stop Sequence" is when the LPC Controller is driving the LPC-nSERIRQ signal low to indicate this is the end of a SERIRQ wave train. The periods of time marked IRQ1, IRQ2, . . . IRQ15 between the Start Sequence and the Stop Sequence marks are the periods of time that a peripheral device may drive the LPC-nSERIRQ low to indicate the peripheral is generating an interrupt request. The peripheral devices are usually assigned interrupt numbers (IRQ1, IRQ2, and etc . . . ) by the system software. The Tunnel Master is considered to be a peripheral device on the LPC bus. The drawing also shows the data in ByteC (Data0) and ByteD (Data1) of the LPC-UD Upstream TLP packets. For LPC SERIQR Request TLP packets, the PCI_Express-to-LPC translator has to drive the LPC_nSERIRQ low for the LPC-nSERIRQ wave train time periods that the associated bits in ByteC or ByteD of the TLP packet are high. In the drawing, it is implied that Bit 1 of ByteC is high and that Bit 7 of Byte D is low. The Tunnel Master has to monitor the LPC-nSERIRQ signal at all times. Once a SERIQR wave train begins, the Tunnel Master can not drive the LPC_nSERIRQ signal low except for the time periods the data in ByteC and ByteD indicate. If a SERIRQ wave train has ended, the Tunnel Master may request another SERIRQ wave train to begin by driving LPC-nSERIRQ low for one LPC-CLK cycle.

Figure 9:
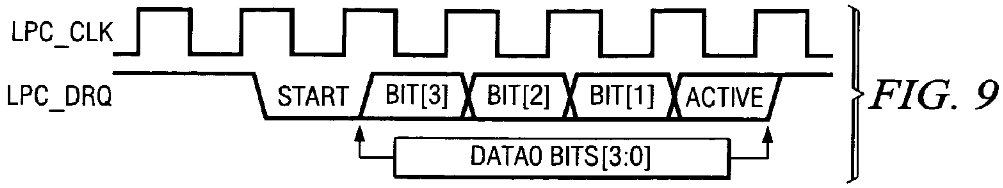
FIG. 9 is a timing diagram for the waveform of an PCI-DMA Request Signal.

FIG. 9 shows the waveform of the LPC-DMA Request. The LPC_DRQ is a dedicated signal on the LPC interface. Each peripheral that has the ability to manage DMA transfers on the LPC bus has a dedicated LPC_DRQ signal. For LPC DMA Request TLP packets, the PCI_Express-to-LPC translator has to drive the LPC_DRQ signal according to the wave train in the drawing. The LPC_DRQ signal is first driven low for one LPC_CLK cycle to indicate the start of a LPC_DRQ wave train. Then the four lowest bits in ByteC (Data0) of the LPC-DMA Request TLP packet are clock out onto the LPC_DRQ signal. If the associated bit in BtyeC is low, LPC_DRQ will be low for that LPC_CLK clock period; if the associated bit in ByteC is high, LPC_DRQ will be high.

There are three different kinds of LPC-TT PCI_Express TLP packets: LPC I/O Read LPC-TT packets, LPC Memory Read LPC-TT Packets, and LPC DMA Write to Host LPC-TT packets as described above. When the PCI_Express-to-LPC Translator receives an LPC-TT packet, this LPC-TT packet will be used to complete the currently active LPC data transaction. The LPC-to-PCI_Express Translator generates LPC_TO TLP packets. Every time the Tunnel Slave receives an LPC-TO packet it has to generate a matching LPC-TT packet. After the LPC-to-PCI_Express Translator generates a LPC_TO packet, it can not generate any more TLP packets until the PCI_Express-to-LPC Translator receives the matching LPC-TT packet. Every time the LPC-to-PCI_Express Translator generates an LPC_TO packet it assigns a unique "tag" number to the LPC-TO TLP packet. The Tunnel Slave will assign the same "tag" number to the matching LPC-TT TLP packet it generates after it receives the LPC-TO TLP packet. When the LPC Packet Manager instructs the LPC-to-PCI_Express Translator to generate a LPC-TO TLP packet, it also places the LPC bus into a suspended state by continuously issuing "Long Wait" sync codes to the LPC Bus. The LPC transaction cycle that caused the LPC-to-PCI_Express Translator to generate an LPC-TO TLP packet is waiting for the PCI_Express-to-LPC Translator to receive the matching LPC-TT TLP packet to complete the LPC transaction cycle. Tables 12A–C show how the LPC transaction cycle is completed by each of the three different kinds of LPC-TT TLP packets. Table 12A shows the data translated from the LPC transaction cycle into LPC-TO TLP packets by the LPC-to-PCI_Express Translator. Table 12B shows LPC transaction cycles that the LPC Packet Manager is holding the LPC bus in a suspended state (Sync1="Long Wait"). Table 12C shows the units what are completed with the information the PCI_Express-to-LPC Translator extracted from the LPC-TT TLP packets. The LPC Packet Manager generates all the Sync codes (Sync1="Long Wait" and Sync0="Ready").

TABLE 12A

| LPC Transaction | Unit 0 | Unit 1 | Unit 2 | Unit 3 | Unit 4 | Unit 5 | Unit 6 | Unit 7 | Unit 8 | Unit 9 | Unit 10 | Unit 11 |
|---|---|---|---|---|---|---|---|---|---|---|---|---|
| LPC I/O Read | Start | T/D | Address (16-bits) | | | | CTAR | | | | | |
| LPC Mem Read | Start | T/D | Address (32-bits) | | | | | | | | CTAR | |
| LPC DMA Wrt | Start | T/D | Ch | Size | CTAR | | | | | | | |

| LPC Transaction | Unit 12 | Unit 13 | Unit 14 | Unit 15 | Unit 16 | Unit 17 | Unit 18 | Unit 19 | Unit 20 | Unit 21 | Unit 22 |
|---|---|---|---|---|---|---|---|---|---|---|---|
| LPC I/O Read | | | | Sync0 | | | PTAR | | | | |
| LPC Mem Read | | | | | | | Sync0 | | | PTAR | |
| LPC DMA Wrt | Sync0 | | | PTAR | | Sync0 | | | PTAR | | |

TABLE 12B

| LPC Transaction | Unit 0 | Unit 1 | Unit 2 | Unit 3 | Unit 4 | Unit 5 | Unit 6 | Unit 7 | Unit 8 | Unit 9 | Unit 10 | Unit 11 |
|---|---|---|---|---|---|---|---|---|---|---|---|---|
| LPC I/O Read | Start | T/D | | | | | CTAR | | Sync1 | Sync1 | Sync1 | Sync1 |
| LPC Mem Read | Start | T/D | | | | | | | | | CTAR | |
| LPC DMA Wrt | Start | T/D | | | CTAR | | Sync1 | Sync1 | Sync1 | Sync1 | Sync1 | Sync1 |

| LPC Transaction | Unit 12 | Unit 13 | Unit 14 | Unit 15 | Unit 16 | Unit 17 | Unit 18 | Unit 19 | Unit 20 | Unit 21 | Unit 22 |
|---|---|---|---|---|---|---|---|---|---|---|---|
| LPC I/O Read | Sync1 | Sync1 | Sync1 | Sync0 | | | PTAR | | | | |
| LPC Mem Read | Sync1 | Sync1 | Sync1 | Sync1 | Sync1 | Sync1 | Sync0 | | | PTAR | |
| LPC DMA Wrt | Sync0 | | | PTAR | | Sync0 | | | PTAR | | |

TABLE 12C

| LPC Transaction | Unit 0 | Unit 1 | Unit 2 | Unit 3 | Unit 4 | Unit 5 | Unit 6 | Unit 7 | Unit 8 | Unit 9 | Unit 10 | Unit 11 |
|---|---|---|---|---|---|---|---|---|---|---|---|---|
| LPC I/O Read | Start | T/D | | | | | CTAR | | | | | |
| LPC Mem Read | Start | T/D | | | | | | | | | CTAR | |
| LPC DMA Wrt | Start | T/D | | | CTAR | | | | | | | |

| LPC Transaction | Unit 12 | Unit 13 | Unit 14 | Unit 15 | Unit 16 | Unit 17 | Unit 18 | Unit 19 | Unit 20 | Unit 21 | Unit 22 |
|---|---|---|---|---|---|---|---|---|---|---|---|
| LPC I/O Read | | | | Sync0 | Data (8-bits) | | PTAT | | | | |
| LPC Mem Read | | | | | | | Sync0 | Data (8-bits) | | PTAR | |
| LPC DMA Wrt | Sync0 | Data(8-bits) | | PTAR | | Sync0 | Data (8-bits) | | PTAR | | |

The Tunnel Slave could take on an in a number of forms. It could be nothing more than the mirror image of the Tunnel Master, translating the PCI_Express TLP packet back into a LPC packet for extending the LPC bus intact into the docking station. Or on the other extreme, there may not even be an LPC bus in the docking stations. In this case the Tunnel Slave would interface directly to the peripheral devices that would normally interface to a LPC bus. But most likely, most Tunnel Slave would take on a form that is some combination of the two extremes described.

Figure 10A:
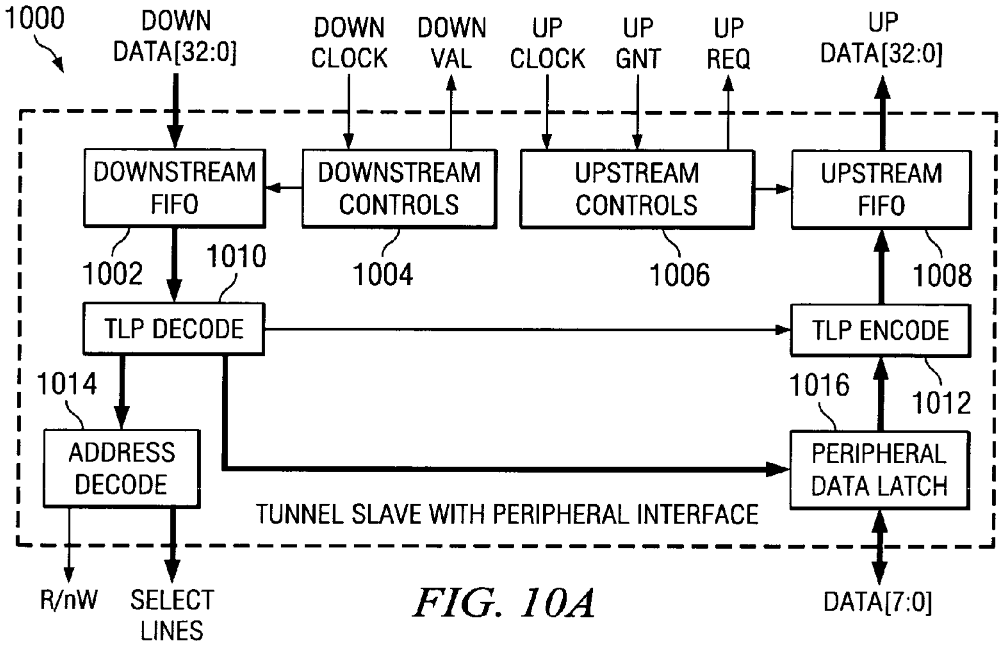
FIGS. 10A and 10B are block diagrams of two possible implementations of a tunnel slave, one with a peripheral interface and one with an LPC bus interface.
Figure 10B:
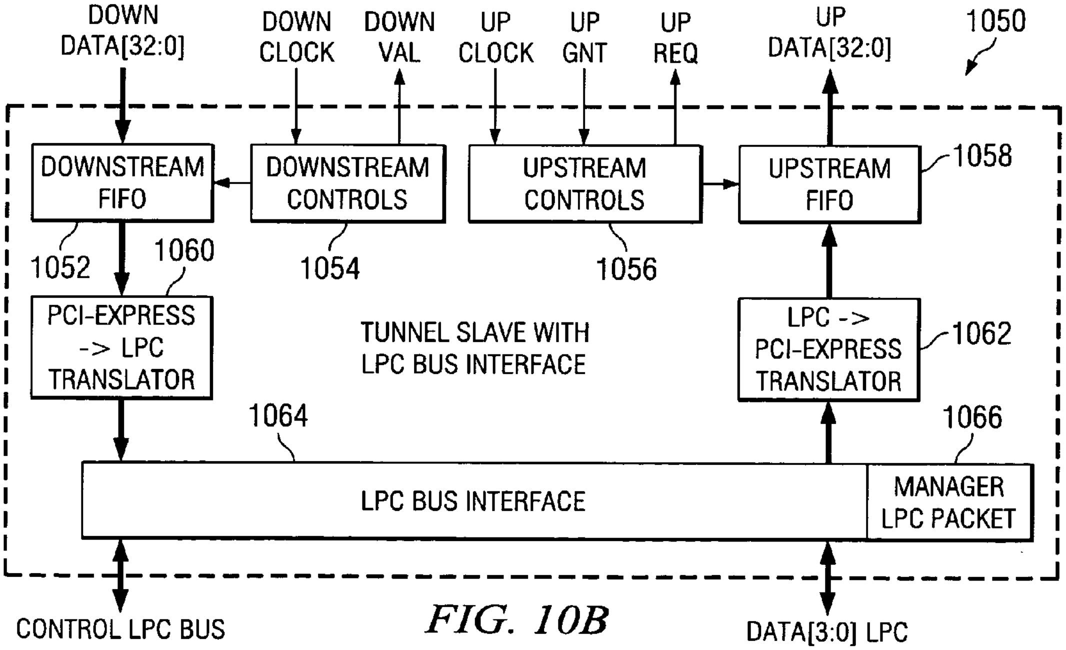

Two possible embodiments of the tunnel slave are shown in FIGS. 10A and 10B, generally as 1000 and 1050, respectively. FIG. 10A shows a tunnel slave with a peripheral interface. The downstream data [32:0] enters the downstream FIFO 1002 which is controlled by the downstream controls 1004. Downstream controls 1004 receive the DownClock signal and generates a down value signal. The output of the downstream FIFO 1002 is coupled to the TLP decode circuit 1010 which has an output coupled to the peripheral data latch 1016 which, in turn, generates the data output [7:0]. The TLP decode circuit has a second output which is coupled to the address decode circuit 1014 which generates the R/nW output signal. A third output of the TLP decode circuit is coupled to the TLP encode circuit 1012 which has an output coupled to the upstream FIFO 1008. Upstream FIFO 1008 generates the up data [32:0] signal under the control of upstream controls 1006 which receives the up clock and up grant signals and generates an up request signal as well as the control signals for the upstream FIFO 1008.

FIG. 10B shows a tunnel slave with an LPC bus interface. The downstream data [32:0] enters the downstream FIFO 1052 which is controlled by the downstream controls 1054. Downstream controls 1054 receives the DownClock signal and generates a down value signal. The output of the downstream FIFO 1052 is coupled to PCI_Express to LPC translator which translates the PCI_Express packets to LPC data transfer packets and outputs them to the LPC bus interface 1064 which generates a control LPC bus signal and a data [3:0] LPC signal. LPC bus interface 1064 is also coupled to the manager for the LPC packet 1066 and has an output coupled to LPC to PCI_Express translator 1062. The LPC to PCI_Express translator 1062 has an output coupled to the upstream FIFO 1058 which is controlled by upstream controls 1056. Upstream controls 1056 receives the upstream clock and upstream grant signals and generates the upstream request signal and the control signal for the upstream FIFO 1058.

The circuits for the blocks of FIGS. 10A and 10B are known to those skilled in the art and need not be discussed in detail here. The LPC Tunneling does not dictate how the LPC data being tunneled through to the docking unit is distributed to the peripheral devices attached to the docking unit, but rather how the Tunnel Slave interfaces to the PCI_Express fabric to complete the tunneling process.

The fact that the Tunnel Slave may have such flexibility is testimony in itself that LPC Tunneling adds a lot of new flexibility to Laptop Docking scenarios. Laptop OEMs now have the option of adding game ports and joy stick interfaces, flash memory, power management, and other features to their Laptop docking stations in a cost effective manner.

All downstream LPC PCI_Express TLP packets will have to be decoded and responded to in the Tunnel Slave. For all downstream LPC-TO PCI_Express TLP packets a matching LPC-TT upstream PCI_Express packet has to be generated and sent upstream as quickly as possible. Regardless of how the data and information decoded from the LPC PCI_Express TLP is farther propagated in the system, the Tunnel Slaves interface to the Hybrid PCI_Express Port is the same. The Tunnel Slave will receive full and complete TLP packets from the Hybrid PCI_Express Port into the Downstream FIFO. The timing of the Tunnel Slave downstream TLP transfer is identical to the timing of the Tunnel Master upstream TLP transfer. The data format of both downstream LPC PCI_Express TLP packets, LPC-TO and downstream LPC-UD, are defined in the discussion of the Tunnel Master above.

When the Tunnel Slave is interfaced to an LPC Bus, the LPC data transaction packet on the docking station's LPC Bus will be identical to the transaction packet that appears on the LPC Bus in the Laptop Unit docked to the docking station with the exception that all the "Long Wait" sync cycles are eliminated. The Tunnel Slave would serve as the LPC Bus Controller in the docking station.

Table 13 shows the content of the TLP Header for both the LPC-TT and LPC-UD upstream PCI_Express TLP packets generated by the Tunnel Slave.

TABLE 13

16 Byte Header for LPC-TO PCI Express TLP Data Packet

| Byte0 | Byte1 | Byte2 | Byte3 | Byte4 | Byte5 | Byte6 | Byte7 | Byte8 | Byte9 | ByteA | ByteB | ByteC | ByteD | ByteE | ByteF |
|---|---|---|---|---|---|---|---|---|---|---|---|---|---|---|---|
| 0x72 | 0x00 | 0x00 | 0x00 | 0xFF | ReqID | tag | 0x7F | 0xFF | DestID | vID | vID | Data0 | Data1 | Data2 | Data3 |

If the LPC Transaction being translated is a LPC I/O Read operation (an LPC-TT packet) then:
- The "ReqID" value in Byte 5 of the Header is 0x03.
- The "DestID" value in Byte 9 of the Header is 0xFB.
- The "tag" value in Byte 6 will be the same as the "tag" value of the LPC-TO TLP generated by the LPC-to-PCI_Express Generator in the Tunnel Master for this same LPC I/O Read operation.
- Data0 in Byte C is the data value to be placed on the LPC bus during the two LPC Transaction units following the "Sync0" unit of the LPC I/O Read operation.

If the LPC Transaction being translated is an LPC Memory Read operation (an LPC-TT packet) then:
- The "ReqID" value in Byte 5 of the Header is 0x05.
- The "DestID" value in Byte 9 of the Header is 0xFD.
- The "tag" value in Byte 6 will be the same as the "tag" value of the LPC-TO TLP generated by the LPC-to-PCI_Express Generator in the Tunnel Master for this same LPC Memory Read operation.
- Data0 in Byte C is the data value to be placed on the LPC bus during the two LPC Transaction units following the "Sync0" unit of the LPC Memory Read operation.

If the LPC Transaction being translated is an LPC DMA Write to Host operation (an LPC-TT packet) then:
- The "ReqID" value in Byte 5 of the Header is 0x07.
- The "DestID" value in Byte 9 of the Header is 0xFF.
- The "tag" value in Byte 6 will be the same as the "tag" value of the LPC-TO TLP generated by the LPC-to-PCI_Express Generator in the Tunnel Master for this same LPC DMA Write to Host operation.
- Data0 in Byte C is the data value to be placed on the LPC bus during the two LPC Transaction units following the "Sync0" unit of the LPC DMA Write to Host operation.
- According to the value of the "size" unit of the LPC DMA Write to Host operation, ByteD, ByteE, and ByteF may also contain valid data. If "size"=01 (16-bit data transfer) or 11 (32-bit data transfer), ByteD contains valid data. If "size"=11 (32-bit data transfer),ByteE and ByteF contain valid data.

If the LPC Transaction being translated is an LPC SERIRQ request (an upstream LPC-UD packet) then:
- The "ReqID" value in Byte 5 of the Header is 0x00.
- The "DestID" value in Byte 9 of the Header is 0xF8.
- The "tag" value in Byte 6 will be set to zero.
- Data0 in ByteC will contain IRQ[7:0] and Data1 in ByteD will contain IRQ[15:0].

If the LPC Transaction being translated is an LPC DMA Request (an upstream LPC-UD packet) then:
- The "ReqID" value in Byte 5 of the Header is 0x01.
- The "DestID" value in Byte 9 of the Header is 0xF9.
- The "tag" value in Byte 6 will be set to zero.
- Data0 [3:0] in ByteC will contain the channel number of the DMA channel being requested and the channel active flag of that channel.

All LPC PCI_Express TLP packets are 16 byte packets. The Hybrid PCI_Express Port has only two additional tasks to perform over those of a normal PCI_Express Port, to inject LPC PCI_Express TLP packets on the source side of a Tunnel Operation and to extract LPC PCI_Express TLP packets on the sink side.

To inject an LPC PCI_Express TLP packet, the Hybrid Port must monitor the normal PCI_Express traffic through the Hybrid link and be able to determine when it has the bandwidth to inject the LPC PCI_Express TLP packet. The sourcing tunnel controller, Tunnel Master or Tunnel Slave, will generate a Request by driving the UpReq or DownReq signal active. When the sourcing Hybrid Port is able to inject the LPC PCI_Express TLP packet it will grant the request by driving the UpGnt or the DownGnt signal active. The sourcing Hybrid Port will not grant the request until it knows it has the bandwidth on the Hybrid link to transmit the entire 16 bytes of the LPC PCI_Express TLP packet.

To extract an LPC PCI_Express TLP packet, the Hybrid Port must monitor the VendorID field (byte 10 and byte 11 of the TLP Header). When the VendorID field of a TLP Header matches the code used to identify LPC PCI_Express TLP packet, the sinking Hybrid Port must capture the 16 byte LPC PCI_Express TLP packet out of the PCI_Express fabric and direct it toward the Tunnel interface. After a LPC PCI_Express TLP packet has been extracted, the sinking Hybrid Port will request a transfer to the tunnel device by driving the UpVal or DownVal signal low. Two clock cycles after driving the Valid signal active, the sinking Hybrid Port will begin transferring the LPC PCI_Express TLP packet to the tunnel device.

While the invention has been shown and described with reference to preferred embodiments thereof, it is well understood by those skilled in the art that various changes and modifications can be made in the invention without departing from the spirit and scope of the invention as defined by the appended claims. For example, the present invention has been described using vendor ID for the packet definition. As is well known to those skilled in the art, other packet definitions such as source/destination can also be used.

The invention claimed is:

1. A computer system comprising:
- a portable computer having a LPC bus for peripheral devices;
- a docking station receiving the portable computer and peripheral devices;
- a PCI_Express (Revision 1.0a) fabric coupling the portable computer to the docking station, the PCI_Express (Revision 1.0a) fabric communicating commands or data between the LPC bus and the peripheral devices; and
- a hybrid PCI_Express (Revision 1.0a) downstream port coupled to the LPC bus and to a computer host for receiving PCI_Express (Revision 1.0a) packets and LPC commands or data for transmission along the PCI_Express (Revision 1.0a) fabric.

2. The computer system of claim 1 further comprising a hybrid PCI_Express (Revision 1.0a) upstream port couplable to a peripheral device and receiving PCI_Express (Revision 1.0a) packets and LPC Transaction Packets from the PCI_Express (Revision 1.0a) fabric.

3. The computer system of claim 1 wherein the hybrid PCI_Express (Revision 1.0a) downstream port receives a half-duplex LPC bus Transaction Packet and converts it to two full duplex PCI_Express (Revision 1.0a) packets for transmission on the PCI_Express (Revision 1.0a) fabric.

4. The computer system of claim 3 further comprising a LPC packet manager which places a long wait sync clock signal on the LPC bus while awaiting a reply to a bi-directional LPC transaction data packet.

5. In a computer docking station to receive a portable computer and peripheral devices, a communications link between the portable computer and the peripheral devices comprising:

a PCI_Express (Revision 1.0a) fabric couplable to the portable computer and at least one of the peripheral devices, the PCI_Express (Revision 1.0a) fabric communicating commands or data between a computer in the docking station and a peripheral device connected thereto; and a hybrid PCI_Express (Revision 1.0a) downstream port couplable to an LPC bus of a computer and to a computer host for receiving PCI_Express (Revision 1.0a) packets and LPC Transaction Packets for transmission along the PCI_Express (Revision 1.0a) fabric.

6. The computer docking station of claim 5 further comprising a hybrid PCI_Express (Revision 1.0a) upstream port couplable to a peripheral device and receiving LPC Transaction Packets from the PCI_Express (Revision 1.0a) fabric.

7. The computer docking station of claim 5 wherein the hybrid PCI_Express (Revision 1.0a) downstream port receives a half-duplex LPC bus Transaction Packet and converts it to two full duplex PCI_Express (Revision 1.0a) packets for transmission on the PCI_Express (Revision 1.0a) fabric.

8. The computer docking station of claim 7 further comprising a LPC packet manager which places a long wait sync clock signal on the LPC bus while awaiting a reply to a bi-directional LPC transaction data packet.

9. A modified PCI_Express (Revision 1.0a) fabric comprising:

a hybrid PCI_Express (Revision 1.0a) downstream port couplable to a computer LPC bus and to a computer host for receiving PCI_Express (Revision 1.0a) packets and LPC data or commands for transmission along the PCI_Express (Revision 1.0a) fabric; and a hybrid PCI_Express (Revision 1.0a) upstream port couplable to a computer peripheral device and receiving PCI_Express (Revision 1.0a) packets and packetized LPC data or commands from the PCI_Express (Revision 1.0a) fabric and separating out the LPC data or commands for use by the computer peripheral device.

10. The PCI_Express (Revision 1.0a) fabric of claim 9 further comprising a PCI_Express (Revision 1.0a) fabric coupled between the PCI_Express (Revision 1.0a) downstream port and the PCI_Express (Revision 1.0a) upstream port.

11. The PCI_Express (Revision 1.0a) fabric of claim 9 wherein the hybrid PCI_Express (Revision 1.0a) downstream port receives a half-duplex LPC bus Transaction Packet and converts it to two full duplex PCI_Express (Revision 1.0a) packets for transmission on the PCI_Express (Revision 1.0a) fabric.

12. The PCI_Express (Revision 1.0a) fabric of claim 11 further comprising a LPC packet manager which places a long wait sync clock signal on the LPC bus while awaiting a reply to a bi-directional LPC transaction data packet.

13. A method of coupling LPC bus Transaction Packets across a boundary between a portable computer and a docking station utilizing a PCI_Express (Revision 1.0a) fabric comprising:

controlling the data flow on the PCI_Express (Revision 1.0a) fabric to insert at a first location on the PCI_Express (Revision 1.0a) fabric PCI_Express (Revision 1.0a) packets corresponding to LPC Transaction Packets into unused portions of the PCI_Express (Revision 1.0a) traffic, receiving PCI_Express (Revision 1.0a) packets at a second location on the PCI_Express (Revision 1.0a) fabric and extracting those packets corresponding to the LPC Transaction Packets; and performing an LPC task.

14. The method of claim 13 further comprising converting half-duplex LPC bus Transaction Packets into two full duplex PCI_Express (Revision 1.0a) packets for transmission on the PCI_Express (Revision 1.0a) fabric.

15. In a method of coupling an LPC bus across a boundary between a portable computer and a docking station, a method of sending serial IRQ or DMA requests from a peripheral device to a processor, comprising:

generating in an LPC slave coupled to the peripheral device a PCI_Express (Revision 1.0a) upstream packet requesting a serial IRQ or DMA request;

injecting the PCI_Express (Revision 1.0a) upstream packet in to a PCI_Express (Revision 1.0a) fabric;

recovering the PCI_Express (Revision 1.0a) upstream packet in the docking station; and utilizing the recovered PCI_Express (Revision 1.0a) upstream packet to generate sideband signals to an LPC controller.

16. The method of claim 15 further comprising:

generating a serial IRQ or DMA request in the LPC controller.

* * * * *